Sept. 16, 1930.　　　K. E. PEILER　　　1,776,237
AUTOMATIC STOP MECHANISM FOR GLASS FEEDING APPARATUS
Filed April 30, 1925
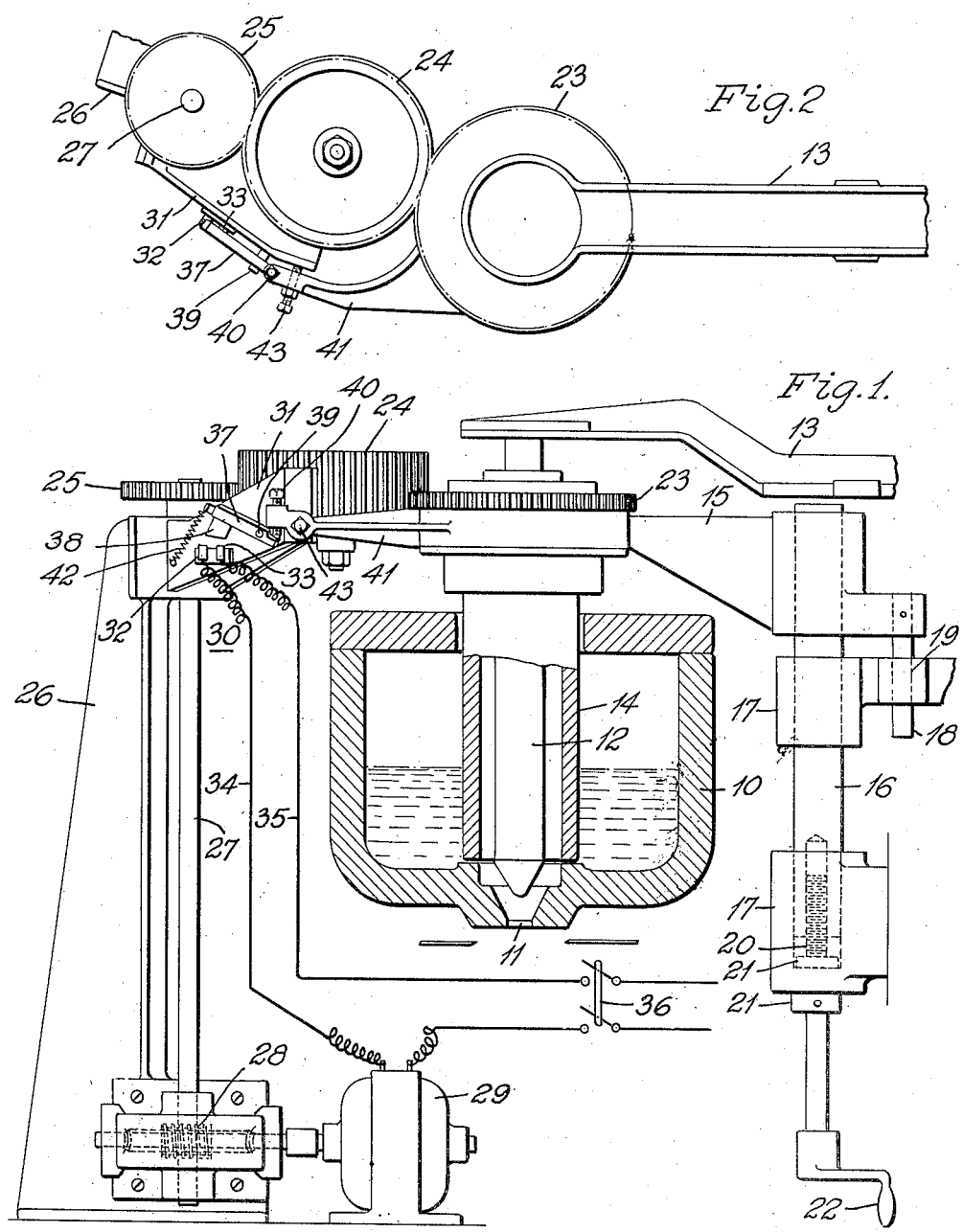
Inventor:
Karl E. Peiler
by Robson D. Brown
Atty.

Patented Sept. 16, 1930

1,776,237

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

AUTOMATIC STOP MECHANISM FOR GLASS-FEEDING APPARATUS

Application filed April 30, 1925. Serial No. 26,887.

My invention relates to apparatus for feeding molten glass and more particularly to feeders of that type in which a vertically movable implement projects into the glass over an outlet in the bottom of a container to control the discharge of glass to form mold charges.

In order that the glass discharged from the outlet may be in a condition of uniform temperature and fluidity, certain glass feeders are provided with means for rotating the implement, thereby stirring the glass in the container prior to its discharge from the outlet. In one type of feeder, the discharge of glass from the outlet is regulated by a reciprocating plunger and the stirring of the glass is accomplished by rotation of the plunger. The plunger is usually provided with means for changing its position toward and from the outlet. In another type of plunger feeder, the stirring is accomplished by a tube which surrounds the plunger. Means are provided for adjusting the tube toward and from the outlet and when the tube is in its lowermost position, it may act as a gate to cut off the flow of glass to the outlet. In other types of feeders, the rotary implement performs the function only of a stirrer and may be operated independently of the glass delivery mechanism.

Whichever form of rotating implement may be employed, there is danger that it may be adjusted to such a low position that abrasion will occur between the implement and the container or the wall of the outlet, thereby damaging the parts, and the present invention has for an object to provide means for controlling the rotary movement of such an implement so that its rotary movement will be stopped before it is moved into dangerous proximity to the outlet.

Another object of the invention is to provide apparatus of the character designated, which shall stop the rotary movement of the feeder implement when lowered in close proximity to the discharge outlet and shall automatically start the rotation of said implement when raised from said outlet.

A further object of the invention is to provide apparatus of the character designated which shall be simple in operation and durable in construction, and shall effectively control the rotary movement of the feeder implement.

These and other objects will be more manifest from the following specification, and specifically set forth in the appended claims.

In the drawing,

Figure 1 is a diagrammatic view in elevation, showing parts of the apparatus in section, and Fig. 2 is a plan view of the apparatus shown in Fig. 1.

There is illustrated in Fig. 1, a feeder comprising a glass container 10, which may be a forehearth connected to a glass furnace, having a discharge outlet 11 through which molten glass is discharged under the control of a vertically reciprocating plunger 12. This plunger is carried by an arm 13 which may be reciprocated in any desired manner by the feeder-operating mechanism and means may be provided for adjusting the path of reciprocation of the lower end of the plunger toward and from the outlet. This plunger may be rotated about its axis to stir the glass adjacent the discharge outlet, but in the illustrated embodiment of the invention, the plunger has no rotary movement, it being employed solely for the purpose of regulating the discharge of glass from the outlet.

Surrounding the plunger 12 is a vertically adjustable tube 14 having its lower end projecting into the glass above the outlet. When this tube is lowered, as shown in the drawing, it acts as a gate to interrupt the flow of glass to the outlet. The tube is supported by an arm 15 and is arranged for rotation so as to set up a circular movement in the glass adjacent the outlet.

As shown, the arm may also be supported for vertical adjustment by any suitable mechanism, as for example by a vertically disposed bar 16. This bar is slidably mounted in suitable bearings 17, 17 and is guided for vertical adjustment by means of a pin 18 adapted to engage a suitable opening 19 provided in the upper bearing 17. The lower end of the bar 16 is adapted to rest at its lower extremity upon a screw 20 supported in the lower bearing 17 by means of collars 21, 21. The screw 20 is operated by a handle 22 to effect the desired vertical adjustment of the tube 14. The mechanism described above may be, and preferably is, substantially as shown in my copending application Serial No. 683,576, filed December 31, 1923.

The tube 14 is rotated by a gear 23 mounted on the top portion thereof and this gear is adapted to be driven by associated gears 24 and 25 which are mounted on a convenient support 26. As shown, the gear 24 is of such a width as to permit the constant meshing of the gears 23 and 24 for the desired vertical adjustment of the tube. The gear 25 is driven by a shaft 27 which is rotated through a suitable reduction gear mechanism 28, by any convenient source of power. I preferably utilize for this purpose an electric motor indicated by numeral 29 and operated independently of the other mechanism.

The mechanism for mounting and operating the rotary tube is specifically set forth in my copending application Serial No. 39,242, filed June 24, 1925.

The present invention provides means for stopping the rotation of the tube 14 before it can be moved into dangerous proximity to the walls of the outlet 11. Any suitable mechanism may be provided to break the driving connection between the tube and the motor 29, but, as illustrated, the rotation of the tube is stopped by cutting off the current of the motor 29 by the switch 30. As shown, this switch mechanism is mounted on an arm 31, formed integral with the support 26, and includes stationary contact members 32 and 33 which connect with lead wires 34 and 35 respectively from any convenient source of electric current controlled by a cutout switch 36. The electric circuit to the motor is completed through the contacts 32 and 33 by means of a pivoted switch bar 37 provided with a depending contact blade 38, which is adapted to engage the contact members 32 and 33. The bar 37 is pivotally mounted on the arm 31 at 39 and is actuated by an adjustable bolt 40 which is carried by an arm 41 extending from the tube support 15. The adjustment of the bolt 40 provides a ready means to accurately time the operation of the switch relative to the vertical adjustment of the tube. The switch bar 37 may be maintained in engagement with the adjusting bolt 40 by any suitable means, as for example, by a spring 42. The switch is thus opened and closed automatically to start and stop the motor when the tube is raised or lowered. The tube support 15 and the gearing support 26 are maintained in proper alignment by means of an adjusting bolt 43 carried by the arm 41 of the tube support 15, as shown in Fig. 2.

Having thus described apparatus constructed in accordance with the present invention, the operation thereof is carried out in the following manner.

In the operation of a feeder employing a reciprocating plunger operating within a rotary tube, as above described, it is essential that the rotation of the tube be stopped before the tube is lowered to final closed position to stop the flow of glass. When it is desired to stop the flow of glass, this may be accomplished by lowering the tube by means of the handle 22 to shut off the supply of glass to the outlet. In moving the tube to stop the flow of glass, the arm 41 of the tube support 15 engages the end of the bar 37 and causes the same to pivot about the point 39 and raise the bar 37 against the action of spring 42, thus breaking the circuit and stopping the electric motor 29. The rotation of the tube being stopped, the tube may now be further adjusted by the hand crank 22 to a finally closed position to stop the flow of glass. When it is desired to start the flow of glass, the tube 14 is raised by the hand adjusting mechanism and the spring 42 causes the switch to close the electric circuit and automatically start the motor.

By the provision of an apparatus constructed in accordance with the present invention, the rotational movement of the feeder implement is effectively controlled by the vertical adjustment thereof, thus avoiding the injurious results which might occur in utilizing rotating feeder implements to perform the functions of a stirrer and of a valve for controlling the flow of molten glass to the discharge outlet of the glass container.

While I have shown and described a preferred form of the invention, it will be understood that various changes may be made therein without departing from the spirit of the invention as expressed in the appended claims.

I claim as my invention:

1. Apparatus for producing mold charges of molten glass, comprising a container for the glass having a discharge outlet, a rotatable and longitudinally movable discharge-controlling implement disposed in axial alignment with said outlet, and means operated by the longitudinal movement of said implement for controlling the rotary motion thereof so as to stop said rotary motion as the implement approaches the outlet irrespective of the continued longitudinal movement of the implement toward the outlet.

2. Apparatus for producing mold charges of molten glass, comprising a container for molten glass having a discharge outlet, a rotatable and vertically movable implement projecting into the glass above said outlet, and means operated by the vertical movement of said implement for controlling the rotary motion thereof so as to stop the rotation of the implement as the implement closely approaches the outlet whether or not the implement continues to move toward the outlet.

3. Apparatus for producing mold charges of molten glass, comprising a container for the glass having a discharge outlet, a plunger disposed in line with said outlet, a rotatable tube surrounding the plunger, said tube being vertically adjustable to control the supply of glass to the outlet, and means for stopping the rotary movement of the tube in response to lowering the tube to control the flow of glass to the outlet.

4. Apparatus for producing mold charges of molten glass, comprising a container for the glass having a downwardly opening discharge outlet, a plunger disposed in line with said outlet, a tube surrounding said plunger and adapted to control the flow of glass to the outlet, said tube having rotary and longitudinal motions, and means operated by the longitudinal movement of said tube for controlling the rotary movement thereof so as to stop the rotation of the tube on a predetermined longitudinal movement of the tube and independently of cessation of the longitudinal movement of the tube.

5. Apparatus for producing mold charges of molten glass, comprising a container for the glass having a discharge outlet, a plunger disposed in line with said outlet, a tube surrounding said plunger and having its lower extremity adjacent to said outlet, means for rotating the tube, means for adjusting the tube longitudinally to control the flow of glass to the outlet, and means operated by the adjusting means for controlling the tube rotating means.

6. In apparatus for discharging molten glass, the combination of a discharge controlling tube, means for rotating the tube, means for moving the tube longitudinally, means inactive prior to a predetermined longitudinal movement of said tube and then rendered effective to control the operation of said tube rotating means, and means for adjusting said control means to vary the operation thereof.

7. In apparatus for discharging molten glass, the combination of a feeder tube, means for rotating the tube, means for adjusting the tube longitudinally, and means operated by the adjusting means for controlling the tube rotating means.

8. In apparatus for discharging molten glass, the combination of a feeder tube, means for rotating the tube, means for adjusting the tube longitudinally, and means operated by the adjusting means for stopping the rotary movement of said tube.

9. In apparatus for discharging molten glass, the combination of a rotatable feeder tube, a support for the tube, means for rotating the tube in the support, means for effecting a vertical adjustment of the support, and means operated by the movement of the support for controlling the tube rotating means.

10. In apparatus for discharging molten glass, the combination of a rotatable feeder tube, a support for the tube, motor operated means for rotating the tube in the support, means for effecting a vertical adjustment of the support, and means operated by the movement of said support for controlling the motor.

11. Apparatus for producing mold charges of molten glass, comprising a container for the glass having a discharge outlet, a rotatable flow-controlling member disposed in axial alignment with said outlet, a support for said rotatable member, means for rotating the member, means for effecting a vertical adjustment of said support, and means operated by the support for controlling the rotation of said flow-controlling member.

12. In apparatus for discharging molten glass, the combination of a rotatable feeder tube, a support for the tube, an electric motor for rotating the tube in the support, means for effecting a vertical adjustment of the support, and means including an electric switch operated by the movement of said support for controlling the motor and the tube rotating means.

13. Apparatus for feeding molten glass, comprising a container having a submerged discharge outlet, a tube having its lower end submerged in the glass above the outlet, means for adjusting the tube toward and from the outlet, means for rotating the tube, and adjustable means associated with the tube and the tube-rotating means for stopping the rotation of the tube automatically when the tube has been lowered to an adjustable distance from the outlet irrespective of further movement of the tube toward the outlet and for again starting the rotation thereof automatically as the tube is raised from the adjusted position.

14. Apparatus for producing mold charges of molten glass, comprising a container for the glass having a discharge outlet, a reciprocable plunger disposed in line with the outlet, a rotatable and longitudinally movable tube surrounding the plunger, means for rotating the tube, and means controlled by definite longitudinal movements of the tube for controlling the rotation of the tube independently of the reciprocations of the plunger, said means for controlling the rotation of the tube being inactive during lesser longitudinal movements of the tube.

15. Apparatus for producing mold charges of molten glass, comprising a container for the glass having a discharge outlet, a reciprocable plunger disposed in line with the outlet, a rotatable tube surrounding the plunger, an electric motor for rotating the tube, and switch mechanism for controlling the operation of the motor independently of the mechanism for reciprocating the plunger.

16. Apparatus for producing mold charges of molten glass, comprising a container for the glass having a discharge outlet, a reciprocable plunger disposed in line with said outlet, a rotatable tube surrounding the plunger, means for rotating the tube, means for vertically adjusting the tube toward and from the outlet to control the supply of glass through said outlet, and means controlled by adjustment of the tube relatively to said outlet for starting and stopping the rotary movement of the tube independently of the mechanism for reciprocating the plunger.

17. Apparatus for feeding molten glass comprising a container for the glass having a discharge outlet, a rotary discharge regulating implement extending into the glass and movable toward and from the outlet, and adjustable means operable on a predetermined adjusting movement of the implement toward the outlet to stop the rotation of the implement.

18. In glass working machinery, two adjacent members, one of said members being rotatable, means for rotating said rotary member, means for adjusting the distance between said members, and means operable automatically by the relative movement of said members into close proximity to each other to stop the operation of said member rotating means.

19. In glass working machinery, two adjacent members normally spaced an adjustable distance apart, one of said members being rotatable, means for rotating said rotary member, means for adjusting the distance between said members, and means responsive to variance of the distance between said members for controlling the operation of said rotating means so as to automatically stop the rotation of said rotary member when the distance between said members is decreased below a predetermined distance irrespective of a further decrease of the distance between the members, and to automatically start the rotation of the rotary member again when the distance between said members is increased beyond said predetermined distance.

20. In glass working machinery, two adjacent members normally spaced an adjustable distance apart, one of said members being rotatable, means for rotating said rotary member, means for adjusting the distance between said members, and means responsive to variance of the distance between said members to stop the operation of said rotating means when the distance between said members is less than a predetermined distance and to again start the rotating means on restoration of said predetermined distance between said members.

21. In glass working machinery, two cooperative glass feeder members, one consisting of a container for molten glass having a discharge outlet, and the other consisting of an implement extending in the glass toward the outlet for cooperating with the outlet to control discharge of glass through the outlet, means for varying the distance between said implement and the outlet, means for rotating one of said feeder members, and means responsive to change of distance between the implement and the outlet for controlling the operation of said rotating means so as to stop the rotation of the implement when the implement is close to the outlet independently of a further decrease of the distance between the implement and the outlet.

22. Apparatus for producing mold charges of molten glass, comprising a container for the glass having a discharge outlet, a reciprocable plunger disposed in line with the outlet, a rotatable tube surrounding the plunger, means for moving said tube longitudinally, a motor for rotating the tube, and means responsive to a predetermined longitudinal movement of the tube to control the operation of the motor independently of mechanism for reciprocating the plunger.

Signed at Hartford, Connecticut, this 28th day of April, 1925.

KARL E. PEILER.